United States Patent [19]
Nelson et al.

[11] 3,901,978
[45] Aug. 26, 1975

[54] SOYBEAN BEVERAGE AND PROCESS

[75] Inventors: Alvin I. Nelson; Marvin P. Steinberg, both of Champaign; Lun-Shin Wei, Urbana, all of Ill.

[73] Assignee: The University of Illinois Foundation, Urbana, Ill.

[22] Filed: July 6, 1973

[21] Appl. No.: 374,581

Related U.S. Application Data

[63] Continuation-in-part of Ser. No. 282,499, Aug. 21, 1972, abandoned.

[52] U.S. Cl. ............... 426/565; 426/598; 426/372; 426/373; 426/508; 426/634; 426/656
[51] Int. Cl.$^2$ ............................................. A23L 2/02
[58] Field of Search .......... 426/456, 460, 464, 372, 426/373, 190, 518, 519, 520, 521, 508, 208, 311, 365, 339, 340, 312, 317, 524, 507, 506

[56] References Cited
UNITED STATES PATENTS

| | | | |
|---|---|---|---|
| 1,281,411 | 10/1918 | Moses | 426/518 |
| 1,444,812 | 2/1923 | Thevenut | 426/365 |
| 2,881,076 | 4/1959 | Sair | 426/373 |
| 2,997,396 | 8/1961 | North et al. | 426/339 |
| 3,288,614 | 11/1966 | Giles | 426/518 |
| 3,399,997 | 10/1968 | Okumura | 426/311 |
| 3,488,199 | 1/1970 | Gander | 426/339 |
| 3,490,914 | 1/1970 | Okumura | 426/524 |
| 3,563,762 | 2/1971 | Kwee-Seong Lo | 426/311 |
| 3,653,912 | 4/1972 | Koski | 426/190 |

OTHER PUBLICATIONS

Hand, Steinkraus, Van Buren et al., "Pilot Plant Studies on Soy Milk," Food Technology, December, 1964, pp. 139–142.

*Primary Examiner*—Raymond N. Jones
*Assistant Examiner*—Ernest G. Therkorn
*Attorney, Agent, or Firm*—Kaufman & Kramer

[57] ABSTRACT

A bland stable aqueous dispersion of whole soybeans is prepared by:

i. tenderizing intact soybean cotyledons until the soybeans exhibit a tenderometer value of between about 16 and about 300 pounds/100 grams of soybeans on a whole bean basis;

ii. heating the intact soybean cotyledons sufficiently to inactivate the lipoxidase enzyme;

iii. forming a slurry of the soybeans and water, said slurry having a soybean concentration of less than about 20 percent by weight;

iv. homogenizing said slurry in at least one pass through a homogenization zone at a pressure between about 1,000 and 10,000 psi. at a temperature between about 32°F. and the boiling point of the slurry at the pressure within the homogenizing zone; and, v. recovering a bland, stable aqueous dispersion of whole soybeans.

34 Claims, No Drawings

SOYBEAN BEVERAGE AND PROCESS

CROSS REFERENCE TO RELATED APPLICATION

This application is a continuation-in-part of copending application Ser. No. 282,499 filed Aug. 21, 1972, now abandoned, the disclosure of which is incorporated herein by reference.

BACKGROUND OF THE INVENTION

The present invention relates to a soybean beverage base and food products prepared therefrom. More particularly, this invention relates to a soybean beverage base exhibiting enhanced nutritional quality, flavor, stability and palatability and to processes for the preparation thereof.

Soybeans have long been used as a well balanced source of nutrients for both animals and humans. In particular, soybeans are an excellent high protein low carbohydrate source. Despite these nutritional credits, the use of soybeans, especially as a beverage base, has been quite limited principally because of the undesirable bean-like or "painty" flavor and odor heretofore associated with such beverages. Prior attempts to overcome this problem have been largely unsuccessful. The undesirable flavor and odor are principally caused by an enzyme system, lipoxidase, which catalyzes the oxidation of the polyunsaturated oils and fats in the soybeans. The reaction takes place quickly whenever: (1) the bean cell structure is damaged, as when the bean cotyledons are bruised, cracked or ground, so that the enzyme and oil are permitted to contact each other, and (2) a minimum amount of water is present. As little as one part in one billion of the reaction product can be detected organoleptically and, for this reason, it is difficult and expensive to remove sufficient reaction product to impart a bland taste to the resulting beverage.

Soybean beverages, principally employed as a substitute for milk, have been prepared for hundreds of years, especially in the Orient, conventionally, by soaking soybeans in water for several hours, followed in order by grinding with water to thereby extract the protein into the aqueous phase, filtering the resulting slurry to recover the protein-rich extract and cooking the recovered filtrate. Although this process is simple and the resulting beverage is high in protein, the product has the distinct bean-like off-flavor and odor which has now become associated with soybean beverages.

It was subsequently found that various heating techniques such as boiling, steaming or infrared treatment of the beans could reduce the off-flavor of the soybean beverages. It soon was recognized, however, that although heating is necessary to reduce the undesirable bean-like flavor, it has the concomitant effect of insolubilizing or denaturing the protein, thereby substantially decreasing the protein concentration in the filtrate. Consequently, a compromise was effected wherein the heating operation was restricted, thereby retaining some of the bean-like off-flavor, in an effort to retain high protein concentration. This compromise has limited the acceptability of the resulting soybean beverages in the Western world and has confined its salability to such areas as animal feeds and non-allergenic milk substitutes for babies, which collectively form what might be considered a non-complaining market.

As diet consciousness sweeps across the Western world, high protein, low carbohydrate substitutes for milk and other dairy products have come into high demand. As opposed to the noncomplaining market which heretofore consumed the bulk of the soybean beverages sold, diet consciousness is a problem generally associated with the adult population whose visual and taste requirements are quite sophisticated. This has resulted in extensive research and developmental efforts to develop a soybean beverage which can be sold as a stable suspension which will not separate on standing, thereby giving rise to the formation of "sludge" in the beverage container. Moreover, there has been great impetus to significantly improve the palatability of the beverage with respect to taste, odor and mouth feel, i.e., a grainy or sandy feeling in the mouth and throat upon swallowing the beverage.

Recently, attempts have been made to prepare soybean beverages from whole soybeans without including an extraction step. In this manner, most of the nutritional components of the soybean are retained in the beverage, the product yield is higher and the labor costs are reduced. These attempts have been largely unsuccessful, resulting instead, in relatively unstable suspensions and poor flavor and mouth feel. Many attempts have been made to reduce the particle size of the solids in a soybean beverage in order to improve mouthfeel and stability since it was believed that poor mouthfeel and lack of stability of the dispersion were related to the presence of large particles remaining in the beverage. In some instances, the suspension has been centrifuged to separate and remove the larger, heavier particles. In other processes, size reduction has been effected through use of hammer mills, roller mills, disc mills, disintegrators, and the like. Such size reduction apparatus has been used alone, in combination and in further combination with homogenizing and/or emulsifying apparatus. Nevertheless, permanently stable suspensions have still not been obtained. In many instances, suspending agents or suspension stabilizers are still required. Moreover, none of these techniques have provided a whole soybean product which combines the features of: (1) being essentially free of the beanlike or "painty," off-flavor normally associated with soybean beverages; (2) maintaining a permanently stable suspension; and (3) exhibiting good mouth feel.

SUMMARY OF THE INVENTION

Accordingly, it is an object of the present invention to provide a soybean beverage which overcomes the deficiencies of the prior art.

It is another object of the present invention to provide a process for preparing a bland, stable aqueous dispersion of whole soybeans.

It is still another object of the present invention to provide a soybean beverage which is essentially free of the bean-like flavor normally associated with soybean beverages heretofore available.

It is still a further object of the present invention to provide a soybean beverage which is essentially stable upon storage.

It is yet a further object of the present invention to provide a soybean beverage which exhibits good mouth feel.

It is also an object of this invention to provide a soybean beverage which can serve as a base for a wide variety of substitute dairy products such as coffee whiteners, yogurt, milk shakes and the like.

These as well as other objects are accomplished by the present invention which provide a process for preparing a bland, stable aqueous dispersion of whole soybeans comprising:

i. tenderizing intact soybean cotyledons until the soybeans exhibit a tenderometer value of between about 16 and about 300 pounds/100 gms. of soybeans on a whole soybean basis;

ii. heating the intact soybean cotyledons sufficiently to inactivate the lipoxidase enzyme;

iii. forming a slurry of the soybeans and water, said slurry having a soybean concentration of less than about 20 percent by weight;

iv. homogenizing said slurry in at least one pass through a homogenization zone at a pressure between about 1,000 and 10,000 psi. at a temperature between about 32°F. and the boiling point of the slurry at the pressure within the homogenizing zone; and v. recovering a bland, stable aqueous dispersion of whole soybeans.

Organoleptic Testing Procedure and Analysis

Organoleptic evaluations of food products have proven to be useful and dependable tool to food chemists in assessing the role of process parameters on the acceptability of the resulting food product to the senses of taste, smell, sight and touch when the food is observed and consumed. The complex sensation that results from the interaction of the senses can be effectively used to measure food qualities. Organoleptic evaluations of the soybean beverage of the present invention in comparison with soybean beverages produced in accordance with known prior art techniques were conducted in order to demonstrate that the soybean beverage of the present invention is significantly superior to the prior art beverages in mouth and throat feel, colloidal stability and absence of the bean-like or painty flavor. These three criteria were employed for the comparative evaluation because they are generally considered to be crucial to product acceptability.

A number of tests were employed to evaluate mouth and throat feel, colloidal stability and in some cases, absence of the bean-like or painty flavor. These determinations were made by personnel selected for expertise in determining product quality and differences in quality between samples. The panel for each test consisted of 8 to 10 people. Samples were presented to each panelist with random number designations which did not identify the particular product or the processing conditions employed.

The following parameters were evaluated in the following manner:

1. Throat and Mouth Feel

Panelists were instructed to shake all samples before tasting. Panelists were instructed to rate each sample according to its mouth and throat feel, particularly noting particles that catch in the back of the mouth and throat. Rating was on a 1 to 9 hedonic scale with 9 defined to be very smooth, similar to cow's milk; 5 defined as borderline or barely acceptable and 1 defined as completely unacceptable. (Reference: Methods for Sensory Evaluation of Food, Publication 1284, Canada Dept. of Agriculture, 1970).

2. Separation Measurement

Panelists were instructed to determine whether a visible line of demarcation between the settled portion and remaining portion of the beverage existed on samples that had remained undisturbed for a period of time. If such was determined, the panelists were instructed to measure and report the height of the line of demarcation and also the total height of the liquid. Results were recorded as a percentage of the beverage that had settled. Example: If the total height was 15 cm and the line of demarcation was 10 cm from the bottom, the result would be recorded as 33.3 separation; if no line of demarcation could be determined, the result would be recorded as 0 percent separation.

3. Degree of Separation

Panelists were instructed to rate the degree of separation of the same sample used in (2) on a 1 to 9 hedonic scale. 9 was defined to be no visible settling or separation; 5 was defined to be partial settling with the line of demarcation at around the 50 percent value; 1 was defined to be very high percentage of separation. Panelists were also instructed that their ratings could be increased if the settled portion appeared to be light and flocculent and that their ratings could be decreased if the settled portion appeared to be heavily compacted.

4. Sludge Evaluation

Panelists were instructed to carefully lift the bottles used in (2) and (3) without disturbing the contents and, by aid of a mirror, to rate sludge accumulation on the bottom of each sample bottle on a 1 to 9 hedonic scale. 9 was defined to be no visible sludge accumulation; 5 was defined as a moderate amount of sludge accumulation; and 1 was defined to be an objectionably great amount of sludge accumulation.

5. Absence of Bean-like or "Painty" Flavor

Panelists were instructed to shake each sample prior to tasting and to rate each sample for absence of bean-like or painty flavor on a 1 to 9 hedonic scale. 9 was defined as no bean-like or painty flavor present; 5 was defined as bean-like or painty flavor present to the extent of borderline acceptability; 1 was defined as a highly objectionable level of bean-like or painty flavor present.

Statistical Analysis Techniques

Data obtained from the various organoleptic evaluations were analyzed statistically by the analysis of variance in a randomized complete block design with panelists as blocks and process beverage samples as treatments. This procedure enables a determination of whether there is a significant difference among samples at the 95 percent or 99 percent confidence levels. This is indicated in the data tables hereinbelow by use of a single asterisk for 95 percent or double asterisk for 99 percent. If no significant differences could be found at the 95 percent confidence level, the designation N.S. is used. In addition, the value for the Least Significant Difference (L.S.D.) was determined for each analysis to determine which sample means are different. This is indicated by placing lower case letters after the treatment. Means with different letters following are judged to be significantly different at the 95 percent confidence level; means with the same letter following are judged not to be significantly different at the 95 percent confidence level. (Reference: Principles and Procedures of Statistics by Steel and Torrie, McGraw-Hill, New York, 1960, p. 106).

Description of the Evaluated Prior Art Samples

Fifteen different soybean beverage products were prepared as described in the patent and research literature. The listing given below gives the designation attached to each sample, and the reference used for the processing procedure. Products were made exactly as described in the literature insofar as possible. Any deviations are noted. Also, when a range for a given variable was indicated in the literature, the level used is given.

In an article entitled "Pilot-Plant Studies on Soymilk" by D.B. Hand et al appearing in *Food Technology — December*, 1964 at page 139 et seq., processes are described for preparing soymilk from dehulled soybeans both with (wet process) and without (dry process) prior soaking. In the latter dry process, the hulls were loosened and the antitryspin was inactivated by steaming for 45 minutes at 212°F. in an autoclave. The moisture was removed from the seed coat by drying 10 minutes at 220°F. The beans were then dehulled and the hulls separated from the cotelydons. The dehulled beans were then ground and slurried with water at 140°F. to a 16 percent slurry. The slurry was passed through a homogenizer at 2,000 psi. and then spray dried. In the wet process, the procedure was the same as in the dry process until after the dehulling step, except the initial autoclaving is limited to 2.5 minutes at 212°F. The dehulled beans were soaked overnight in water and then drained and steamed for 45 minutes at 212°F. The steamed beans were then ground with water to form a slurry at 16 percent solids. The slurry was homogenized at 2,000 psi. and spray dried.

Various samples were prepared in accordance with the procedures set forth in Hand et al as follows:

1. Hand, Dry

Samples prepared according to procedure of Hand, et al. (*Food Technology, December*, 1964, p. 139, "Soymilk from Dehulled Soybeans") except that, following homogenization, the 16 percent soy slurry was diluted to 9 percent solids, bottled, cooled, and put in storage at 34°F.

2. Hand, Dry-Reconstituted

Sample prepared as for Hand, dry, but after homogenization it was spray-dried (In a Nichols Engineering and Research Corporation spray drier, No. 1403) at 180°–210°C. inlet temperature and 70°–90°C. outlet temperature. Product was reconstituted by thoroughly mixing 9 percent by weight of powder with water and allowing time to completely rehydrate under refrigeration (34°F.).

3. Hand, Wet

Samples were prepared according to the procedure of Hand, et al. (*Food Technology*, December 1964, p. 140, "Soymilk from Soaked Dehulled Soybeans") except that, following homogenization, the 16 percent soy slurry was diluted to 9 percent solids, bottled, cooled, and put in storage at 34°F.

4. Hand, Wet-Reconstituted

Samples prepared as for Hand, et al., wet but spray-dried following homogenization (in a Nichols Engineering and Research Corporation spray drier, No. 1403) at 180°–210°C. inlet temperature and 70°–90°C. outlet temperature. Product was reconstituted by thoroughly mixing 9 percent by weight of powder with water and allowing time to completely rehydrate under refrigeration (34°F.).

In Mustakas, et al., U.S. Pat. No. 3,639,129, there is described a process by which soybean flour is converted into a spray dried powder which allegedly forms a stable emulsion when mixed with water comprising: dispersing soybean flour in water to make a slurry containing about 20 percent or less solids; reducing the particle size of the flour to about 5 to 40 microns in diameter by wet milling; homogenizing and emulsifying the slurry and spray drying the resulting emulsion.

The following samples were prepared in accordance with Mustakas, et al:

5. Mustakas, 11 percent

Samples prepared according to the procedure of Mustakas, et al. (U.S. Pat. No. 3,639,129), Example 1, except following homogenization, the liquid vegetable protein beverage base was bottled, cooled and stored at 34°F.

6. Mustakas, 9 percent.

Samples prepared as for Mustakas, 11 percent except following homogenization, the base was diluted to 9 percent, heated to 180°F. to effect pasteurization, bottled, cooled and stored at 34°F.

7. Mustakas, Reconstituted

Samples prepared as in Mustakas, 11 percent but following homogenization, spray dried (in a Nichols Engineering and Research Corporation spray drier, No. 1403) at 250°–265°F. inlet temperature and 150°–160°F. outlet temperature). Product was reconstituted by thoroughly mixing 9 percent by weight of powder with water and allowing time to completely rehydrate at 34°F.

In the Lo patent, U.S. Pat. No. 3,563,762, processes are described wherein a full fat soybean flour is combined with stabilizing ingredients and water. The resulting solution is heated in order to assist in merging the stabilizer with the solution. Thereafter, the solution is cooked and agitated. Centri-fuging may be employed to reduce the heavy particle content and thereby aid in preventing any settling. Following stabilization, the beverage is homogenized under high pressure. The soybean flour used in this process is prepared by heating beans at 300°C. and dehulling the beans by impact air aspiration. The beans are then ground in a hammermill, extrusion cooked, toasted and ground into a fine flour.

The following samples were prepared in accordance with the Lo process:

8. Lo-A

Samples were prepared according to the procedure of Lo (U.S. Pat. No. 3,563,762; FIG. 1 and FIG. 2). Exceptions to the exact Lo process are as follows: Toasting was done in a natural, upward convection oven rather than in a forced air oven. Hulls were removed by passing through a Burr mill followed by air separation. Flaking, extrusion, cooking, toasting, and cooling were done according to the patent. Grinding was performed by passing twice through an Alpine pin mill. Classification was not performed due to the presence of much free liquid fat in the ground soy powder. Formulation was as in Table 1 of the patent, with refined soybean oil, carageenan, bicarbonate, etc., but without added vitamins and on a smaller scale. Following bottling, the product was not sterilized, but rather, cooled and stored at 34°F.

9. Lo-B

Samples prepared as for Lo-A but formulated without carageenan (this sample was prepared in order to present a fair comparison between the Lo process and the process of present invention which does not require use of any stabilizers).

10. Lo-C

Samples prepared as for Lo-B but formulated without refined soybean oil. (This sample was prepared in order to provide a fair comparison between the Lo process and the process of present invention which does not require oil addition.)

11. Lo-D

Samples prepared as for Lo-C but formulated without sugar and salt. (This sample was prepared in order to provide a fair comparison between the Lo process and the process of present invention which does not require addition of sugar or salt.)

In the Miles patent, U.S. Pat. No. 3,288,614, there is disclosed a process for producing soymilk by cracking the soybeans, dehulling, flaking, adding water containing EDTA to the flakes to form a slurry, subjecting the slurry to pressure cooking at 250°F and then to high pressure homogenization; centrifuging the homogenized slurry to remove fine solids and then formulating the extracted liquid by the addition of selected ingredients, the homogenizing again at 2,750 psi., and bottling and cooling at 34°F.

The following samples were prepared in accordance with the Miles process:

12. Miles-A

Samples were prepared according to the procedure of Miles (U.S. Pat. No. 3,288,614, Example 1). One lb. flakes to 1 gallon water was used. Pressure cooking was at 250°F. for 4 minutes. It was necessary to blend the hot slurry in a Waring blender to facilitate homogenization at 180°F. Following homogenization, the slurry was diluted to 9 percent solids, rehomogenized, bottled, cooled and stored at 34°F.

13. Miles-B

Samples were prepared similar to Miles-A except slurry was cooled to about 85°F. prior to the first homogenization.

14. Miles-C

Samples were prepared similar to Miles-A except the soy slurry was clarified following the first homogenization, and not further diluted.

15. Miles-D

Samples were prepared similar to Miles-C except soy slurry was cooled to about 85°F. prior to first homogenization.

Description of the Present Invention Samples

The process of the present invention was conducted in the manner set forth hereinabove and described in more detail below. Six variations of the soybean beverage of the present invention were prepared for comparative purposes. These variations are identified as follows:

1. Flavored

Product of present invention formulated with salt, sweetener, and additional flavoring compounds.

2. Unflavored

Product of present invention formulated with sweetener and salt.

3. No designation

Product of present invention formulated with no added sweetener, salt or flavoring.

4. With hulls

Product of present invention utilizing whole bean, including hulls.

5. Dehulled

Product of present invention utilizing beans that were dehulled following cooking.

6. Reconstituted

Product of present invention reconsituted at 9 percent solids from spray dried 12 percent soy base in a Nichols Engineering and Research Corp. spray drier, No. 1403 at 180°–210°C. inlet temperature and 70°–90°C. outlet temperature.

Organoleptic Comparison

The results of the organoleptic testing of the various products are summarized in Tables 1 through 6 below. The sample designations are given above. The asterisks and letters are statistical symbols as defined above.

TABLE 1

Panel Mean Scores for Evaluation of Beverages Produced By the Present Process vs. the Hand Process-Four Hours After Shaking

| Sample | Throat & Mouth Feel** | Separation Measurement** | Sludge Evaluation** |
|---|---|---|---|
| Present Process (dehulled, flavored) | 8.22(a) | 0 | 8.78(a) |
| Hand, wet | 2.26(b) | 29.1(b) | 3.44(b) |
| Hand, dry | 2.22(b) | 46.4(c) | 2.11(c) |

TABLE 2

Panel Mean Scores For Evaluation Of Beverages Produced By The Present Process vs. The Hand Process-16 Hours After Shaking

| Sample | Throat and Mouth Feel** | Separation Measurement** | Degree of Separation** | Sludge Evaluation** |
|---|---|---|---|---|
| Present Process (dehulled) | 7.72 (a) | 0 (a) | 9.0 (a) | 9.0 (a) |
| Present Process (with hulls) | 7.50 (a) | 0 (a) | 9.0 (a) | 9.0 (a) |

TABLE 2-Continued

Panel Mean Scores For Evaluation Of Beverages Produced By The Present Process vs. The Hand Process-16 Hours After Shaking

| Sample | Throat and Mouth Feel** | Separation Measurement** | Degree of Separation** | Sludge Evaluation** |
|---|---|---|---|---|
| Present Process (dehulled reconstituted) | 5.89 (a) | 6.4 (b) | 7.56 (b) | 6.89 (b) |
| Present Process (with hulls reconstituted) | 6.22 (a) | 11.3 (c) | 6.33 (c) | 5.89 (b,c) |
| Hand, wet | 2.00 (b) | 32.2 (d) | 4.83 (d) | 5.0 (c) |
| Hand, dry | 3.00 (b) | 46.2 (e) | 4.06 (d) | 2.22 (c) |
| Hand, wet reconstituted | 2.56 (b) | 31.7 (d) | 4.56 (d) | 5.11 (d) |
| Hand, dry reconstituted | 2.56 (b) | 50.3 (f) | 2.67 (e) | 1.44 (d) |

TABLE 3

Panel Mean Scores For Beverages Produced By The Present Process vs. The Mustakas Process-4 Hours After Shaking

| Sample | Throat and Mouth Feel (N.S.) | Separation Measurement** | Degree of Separation** | Sludge Evaluation** |
|---|---|---|---|---|
| Present Process (with hulls) | 6.50 (a) | 0.3 (a) | 8.9 (a) | 9.00 (a) |
| Mustakas, 9% | 4.82 (b) | 42.9 (b) | 5.0 (b) | 8.10 (a,b) |
| Mustakas, 11% | 4.97 (b) | 49.0 (b) | 5.3 (b) | 7.20 (b) |
| Mustakas, reconstituted | 4.62 (b) | 57.7 (c) | 2.6 (c) | 3.90 (c) |

TABLE 4

Panel Mean Scores For Beverages Produced By Present Process vs. Mustakas Process-28 Hours After Shaking

| Sample | Separation Measurement** | Degree of Separation** | Sludge Evaluation** |
|---|---|---|---|
| Present Process (with hulls) | 0 (a) | 8.89 (a) | 8.78 (a) |
| Mustakas, 9% | 62.1 (b) | 2.67 (b) | 5.67 (b) |
| Mustakas, 11% | 59.2 (b) | 4.22 (c) | 4.89 (b,c) |
| Mustakas, reconstituted | 66.0 (b) | 1.67 (d) | 3.67 (e) |

It can be readily seen from the above data that the soybean beverages produced in accordance with the present invention are statistically significantly superior on an overall basis as compared to all of the prior art processes evaluated. In particular, the soybean beverage of the present invention is superior to the Hand, Mustakas and Miles products with respect to throat and mouth feel. The product of the present invention is also superior to the Hand, Mustakas, Lo and Miles products with respect to colloidal stability. The product of the present invention is also superior with respect to the absence of a bean-like or painty flavor as compared to

TABLE 5

Panel Mean Scores For Beverages Produced By The Present Process vs. The Lo Process-7 Days After Shaking

| Sample | Throat and Mouth Feel (N.S.) | Separation Measurement** | Degree of Separation** | Sludge Evaluation** |
|---|---|---|---|---|
| Present Process (with hulls) | 6.33 (a) | 0 (a) | 9.00 (a) | 9.00 (a) |
| Lo, A | 7.33 (a) | 48.3 (b) | 5.55 (b) | 6.44 (b) |
| Lo, B | 6.44 (a) | 68.3 (d) | 1.88 (c) | 6.22 (b) |
| Lo, C | 6.77 (a) | 57.0 (c) | 2.66 (c) | 6.33 (b) |
| Lo, D | 6.88 (a) | 50.4 (b) | 2.88 (c) | 6.33 (b) |

TABLE 6

Panel Mean Scores For Beverages Produced By The Present Process vs. The Miles Process-5 Days After Shaking

| Sample | Throat and Mouth Feel** | Absence of Painty-Bean-Like Flavor** | Separation Measurement** | Degree of Separation(N.S.) | Sludge Evaluation** |
|---|---|---|---|---|---|
| Present Process (with hulls unflavored) | 8.13 (a) | 8.50 (a) | 0 (a) | 9.00 (a) | 9.00 (a) |
| Miles, A | 4.13 (c) | 4.12 (b) | 34.5 (b,c) | 7.12 (a) | 8.13 (c) |
| Miles, B | 5.63 (b,c) | 2.25 (b) | 50.0 (c) | 6.25 (a) | 8.25 (b,c) |
| Miles, C | 5.50 (b,c) | 4.25 (b) | 36.6 (b,c) | 7.25 (a) | 8.75 (b,c) |
| Miles, D | 6.75 (a,b) | 3.75 (b) | 22.4 (b) | 8.37 (a) | 9.00 (a) | the Miles product, the only product which was compared to the product of the present invention on a flavor basis.

At the present time, the reasons for the clear superiority of the soybean beverages of the present invention as compared to the prior art are not completely understood; however, while not wishing to be bound by any proposed theory or mechanism, it is currently believed that the combination of tenderization of the intact soybean cotyledons and homogenization of the slurry resulting therefrom results in the formation of hydrophilic lipid-protein complexes which enable the present soybean dispersion to remain stable, with no appreciable separation, for over two months. Soybean protein is normally quite hydrophobic. This lead to protein aggregation causing precipitation of the resultant relatively heavy particles. Collodial stability of a soybean beverage can be defined as the continued maintenance of a homogeneous liquid system, i.e. the absence of the separation, either settling or floating, of the solids within the liquid. The system is not, in fact, a true colloidal system because the particle size of the solids exceeds the range normally considered as being the colloidal size range. Thus, contrary to the prior art concern for the obtainment of small particle size as a prerequiste for good stability and mouthfeel, it is now believed that hydration of the protein renders it more hydrophilic thereby enabling prolonged suspension thereof. Tenderization of the intact soybean cotyledon in accordance with the present invention is believed to effect hydration of the molecular constituents of the soybean, e.g., the proteins, carbohydrates, combinations thereof, etc. Thus, upon tenderization, the soybean protein becomes more amenable to subsequent phospholipid-protein complex formation during homogenization. The resulting complex is believed to comprise a protein particle enveloping a core of soybean oil with hydrophilic moieties of phospholipid molecules emanating from the protein particle, said hydrophilic phospholipid moieties tending to create a water sheath about the protein in the aqueous dispersion, thereby imparting a hydrophilic character to the resulting complex. Moreover, because of the soybean oil core, the resulting complex exhibits less density than normal protein particles, thereby assisting in avoiding settling and maintaining the stability of the suspension.

Detailed Description of the Invention

All known varieties of soybeans can be employed in practicing the present invention. Typical varieties include Hark, Wayne, Amsoy, Corsoy, Clark and the like.

Normally, soybeans are removed from their pods and stored "dry" at moisture contents of about 10 to 12 percent and at normal ambient temperatures. Storage under conditions for a year or more will not result in deterioration of the beans.

Preferably, for the purposes of this invention, dry soybeans are air-cleaned by conventional means, inspected and off-colored and defective beans as well as foreign matter such as stones removed.

The initial step in the process of the present invention is tenderization of the intact bean cotyledons. it is considered important that tenderization be effected with intact soybean cotyledons. The term "intact soybean cotyledon" as used herein is intended to encompass whole soybean whether with or without hulls. It is considered critical, however, that the cotyledons be retained intact, i.e., retain their structural integrity, during at least a portion of the tenderization process wherein the lipoxidase is inactivated.

Tenderization can be effected in accordance with the present invention by exposing the intact cotyledons, i.e., the whole soybean whether with the hulls intact or during or after dehulling, to a combination of moisture and heat, either simultaneously or sequentially, until a tenderometer value in the range of from about 16 to about 300 pounds per 100 grams soybeans on a whole bean basis is obtained. Exposure to heat at some point in the tenderization process is necessary to prevent the bean-like or painty flavor in the resulting beverage.

The desired degree of tenderization as measured by tenderometer value can be obtained in several different ways. For example, the soybean can be thoroughly soaked in tap water, softened water, or most preferably in a slightly alkaline, aqueous solution (7.5 – 8.5pH) for several hours or until the beans are saturated with the solution. A practical ratio of solution to beans is about one gallon to 3 or 4 pounds of beans. While the aqueous solution can be made alkaline in any conventional manner such as by adding a base thereto such as NaOH, KOH, $Na_3PO_4$ $Na_2CO_3$, and the like, it is considered preferable to add $NaHCO_3$ at 0.5 percent concentration, thereby obtaining a solution pH of above 7.8. The soaking is preferably carried out at room temperature for a period of 4 to 10 hours; although, the soaking period can be shortened by soaking at elevated temperatures of from above room temperature (~77°F.) to about 212°F.

Although not considered necessary, the use of an alkaline solution as the soak medium is considered preferable since it has been found to impart a degree of flexibility to the process of the present invention. It has been found that when an alkaline soak medium and most preferably, a sodium bicarbonate (NaHCO) solution is employed, it has the effect of enhancing the tenderization process thereby reducing the time and/or temperature requirements for effecting tenderization.

If the beans are soaked as described above, then the solution can be drained off from the soaked beans, and a fresh neutral to slightly alkaline solution, preferably 0.5% $NaHCO_3$, added to cover the beans (about 1 gallon to 3 pounds of beans). The soybeans, either soaked or unsoaked as aforesaid, can then be blanched at or near the boiling temperature of the solution for a period of time sufficient to inactivate the lipoxidase in the bean. Typically, this requires a minimum of about 5 minutes and generally 20–40 minutes depending upon such variables as bean variety and storage conditions. The blanching also kills the anti-trypsin factor present in soybeans, thereby improving the nutritional value of the product as well as giving it a completely bland taste as a result of inactivating the lipoxidase present. In the present process, blanching can also be effected by direct treatment with steam or other heat source in which instances, the duration of treatment will vary will the ability of such treatments to effect the desired degree of tenderization. As indicated, blanching alone, without prior soaking, can be employed to effect tenderization of the beans. If soaking is employed, however, a subsequent heat treatment is necessary to inactivate the lipoxidase and trypsin inhibitor.

Other means for exposing the beans to the combined effects of moisture and heat can similarly be employed. For example, pressure cooking can be employed with or without prior soaking of the beans.

Regardless of the method of tenderization employed, the proper degree of tenderization can be easily determined through use of a L.E.E.-Kramer Shear Press equipped with an electronic recording attachment (Laboratory of Electronic Engineering, Washington, D.C.). 100 grams (wet weight) of tenderized beans are placed in the standard test cell (cell No. C274) for each determination. The piston stroke is adjusted to take 14.5 seconds employing a 3,000 lb. test ring. Results are expressed as maximum shear force in lbs. per 100 grams of wet weight of soybeans. Employing this procedure, it has been found that in order to obtain the superior soybean beverage of the present invention, tenderization of the soybeans must first be effected to a tenderometer value in the range of from about 16 to 300 pounds per 100 grams (wet weight) soybeans. The lower limit is specified as about 16 pounds per 100 grams only because this is in the minimum reliable value that can be read on the L.E.E.-Kramer Shear Press with the test cell employed. Tenderization to this value gives a satisfactory product. Some additional tenderization beyond this point may also give a satisfactory product. However, it has found that the tenderization step can be overdone; although overtenderization does not affect stability, it does have a detrimental effect on mouth feel. Overtenderization can occur, for example, if blanching is conducted for an excessive period of time such as about 70 minutes or if several tenderization procedures are combined such as water soaking and pressure cooking. If the beans are insufficiently tenderized beyond a tenderometer value of about 300 pounds per 100 grams, the resulting beverage will be unsatisfactory in either colloidal stability or mouth feel or in both. While combinations of procedures can be employed in the present invention, the degree of tenderization should be periodically determined to ascertain the proper duration of treatment.

Heating, as part of the tenderization process, must be conducted on the intact cotyledons in order to inactivate the lipoxidase and prevent the bean-like or painty flavor in the final product. Thus, for example, if the beans are simultaneously ground (thereby destroying the structural integrity of the cotyledons) and heated, the resulting beverage exhibits poor flavor. The same poor result is obtained if the beans are first ground and then heated. Heating just sufficiently to inactivate the lipoxidase will result in a beverage with unacceptable stability and mouth feel. The heating of whole soybeans must be continued at least until the maximum acceptable tenderometer reading of about 300 pounds is attained. However, this tenderization after lipoxidase inactivation need not be done on the intact cotyledons; the soybeans may be dehulled and the cotyledons may be subdivided to varying degrees for further tenderization. Such subdivided soybeans at the same degree of tenderness will give a lower tenderometer reading by virtue of the mechanics of the test cell. Thus, a new specification giving equivalent tenderness must be developed for each degree of subdivision.

After tenderization, it is preferred to drain off the blanching solution and wash the whole beans with water. At this point, it is convenient to dehull the beans if a less creamy product with lower fiber content is desired. The hulls can be removed earlier while the beans are still dry, but a satisfactory product is obtained if the hulls are not removed at all. It has been found that by dehulling, the resultant product does have a lower fiber content and viscosity. Thus, one factor in determining whether or not to dehull is the desired final viscosity and fiber content.

An aqueous slurry of the tenderized beans is made by wet milling or grinding. The moisture content is adjusted at this stage. A slurry concentration of from about 10 to 15 percent by weight of soybean solids is preferred. Suitably, milling can be effected with any conventional mill such as a hammer mill (Fitzmill), roller mill, disc mill, Rietz disintegrator, or the like which will readily break up the beans to form a slurry. One or more wet milling steps can be utilized. Other conventional milling procedures and apparatus can be employed and give comparable results. Milling is not considered critical to the present invention. The purpose of milling is to reduce the particle size of the beans so as not to clog or damage the valves of the subsequently employed homogenizer. Thus, depending upon the capacity or capability of the homogenizer employed, milling may be dispensed with altogether. However, for most efficient operation, it is considered preferable to reduce the particle size of the beans to less than about 0.25 inch and most preferably, the particles are milled to a size at least as fine as a Fitzmill No. 1 screen to give an easy-to-handle slurry. During the milling operation, water is added to the soybeans to form a slurry having a solids concentration of less than about 20% and preferably, about 10 to 15 percent. The slurry concentration is not considered critical and is dependent upon the viscosity which can be conveniently handled by the homogenizer. Generally, a concentration of less than about 20 percent is employed, most preferably however, the slurry concentration is less than about 12 percent. As the slurry concentration decreases, the temperature and pressure requirements within the homogenizer become commensurately less severe to effect the same degree of homogenization.

The resulting slurry is thereafter subjected to homogenization under pressure. It has been found in accordance with the present invention that the minimum degree of homogenization required to obtain the superior soybean beverage products of the present invention is inversely related to the degree of tenderization of the soybeans, i.e., as the soybeans become more tenderized, the homogenization conditions, e.g., pressure, temperature, and the number of passes or stages through the homogenizer can be reduced or become less severe. In general, homogenization of the soybean slurry can be effected at pressures ranging from about 1,000 to about 10,000 psi with the slurry temperature ranging from about 32°F to about the boiling point of the slurry at the pressure maintained within the homogenizer. Conditions of temperature and pressure within the homogenizer must be maintained so that the slurry is maintained essentially in the liquid state at all times; otherwise, processing difficulties will be encountered within the homogenizer. It has been observed that slurry temperatures and homogenizing pressure vary inversely, i.e. to effect a given degree of homogenization at low slurry temperatures, higher pressures should be employed and conversely, lower pressures within the range set forth should be employed at higher slurry temperatures. As indicated hereinabove, the severity of the homogenization conditions can be further lessened if the slurry concentration is decreased. Also, the degree of homogenization will depend upon the number of passes through the homogenizer or passage through a number of stages in a given homogenizer.

As described hereinabove, the soybeans are tenderized to a degree such that they exhibit a tenderometer value ranging from about 16 to about 300 pounds per 100 grams soybeans and preferably, exhibit a tenderometer value of from about 16 to less than about 185. It has now been found that depending upon the degree of tenderization of the soybeans, commensurately more or less stringent homogenization conditions will be required to obtain a superior product. Thus, for example, is soybeans are tenderized in accordance with the present invention to a tenderometer value of 165 pounds per 100 grams of soybeans, a superior soybean beverage is obtained by homogenization of a 12 percent of such beans at a slurry temperature of 180°F upon passing the slurry through the homogenizer twice at 3,500 psi. In comparison, beans tenderized to a tenderometer value of only 250 require, for obtainment of a superior product, more stringent homogenization at a slurry temperature of about 210°F by passing twice through the homogenizer at a pressure of about 5,000 psi. Homogenization of this latter slurry under the conditions employed for the former-described slurry, will result in a beverage of only borderline acceptability. Thus, it has been found that beans tenderized to a tenderometer value ranging from about 16 to less than about 185 can be homogenized under relatively mild conditions to provide a superior beverage. Generally, assuming a slurry concentration of 10 - 15 percent, homogenization can be effected in at least one and preferably two passes (or stages) through the homogenizer at pressures ranging from 1,000 to less than about 6,000 psi with slurry temperatures ranging from about 32°F to about the boiling point of the slurry at the system pressure. Preferably, such slurries are homogenized at about 180°F by passing the slurry twice through the homogenizer at about 3,500 psi. When, however, the beans are tenderized to a tenderometer value ranging from about 185 to about 300, it has been found that successful homogenization can be effected by passing the slurry, at temperatures ranging from about 180°F to about the boiling point of the slurry under the system pressure, through the homogenizer at least once and preferably twice, at pressures ranging from greater than about 6,000 to about 10,000 psi. If the pressure is sufficiently high during the first pass, i.e., about 8,000 to 10,000 psi, the pressure in the second pass can be lower, e.g. about 3,500 to 6,000 psi, if desired. Of course, as indicated above, required homogenizer conditions will become more severe, i.e. higher pressures and/or temperatures, as the slurry concentration is increased up to about 20 percent.

If alkaline solutions are employed at any point in the process, it is considered perferably although not necessary that the final product be neutralized by addition of an acid such as hydrochloric acid prior to the last homogenization. A wide variety of additives can be added to the beverage of the present invention most conveniently just before the last homogenization. Thus flavorings, sugar, salt and the like can be added, as desired. The beverages of the present invention, as distinguished from the prior art, does not require stabilizers, emulsifiers and the like to maintain stability of the dispersion upon storage. Moreover the beverage of the present invention remains stable and does not separate regardless of its ultimate dilution or viscosity and regardless of whether it is prepared with or without inclusion of the soybean hulls. In addition, the product of the present invention can utilize the whole bean including the hulls, In contradistinction to many prior art processes, there is no need in the present invention to remove any of the bean constituents in order a stable product.

If the slurry has been heated sufficiently before homogenization, there is generally no need to pasteurize the soybean beverage separately. If, however, lower homogenization temperatures are employed, the resulting beverage must be pasteurized to at least partially sterilize the beverage. The pasteurized beverage can then be bottled, spray-dried, freeze-dried or the like. The pasteurized beverages will remain stable until residual microbial action generates sufficient acid to gel and thus spoil the product. Alternatively, the beverage can be sterilized and canned, or condensed, sterilized and canned. The sterile, canned product has remained stable for over two years.

The homogenized whole bean slurry, the basic product of the present invention, is rich-tasting although relatively low in fat content which, advantageously, is liquid (unsaturated) soybean oil and contains no cholesterol. There is no ojectionalbe mouth or throat feel; and of course, since the lipoxidase has been inactivated, there is no discernable bean-like or painty flavor. The beverage is a non-settling, non-creaming dispersion which is less susceptible to microbiological deterioration than whole cow's milk. Refrigeration at 45°F or lower will prevent spoilage at room temperature or the product can be preserved by canning or dehydration.

The stable, bland soybean dispersion obtained in accordance with the present invention can be employed as a palatable, nutritious beverage base for a wide variety of products such as soy milk, flavored soy milk, frozen soy milk desserts, soy milk shakes, flavored spreads or dips, yogurt, diet margarine, soybean butter, custard, oriental tofu and the like.

In the preparation of shakes from the beverage base of the present invention, it is considered perferable to lower the viscosity of the dispersion thereby enhancing its whipping characteristics. In order to lower the viscosity of the final product, it has been found that the addition of from about 100 to about 400 parts per million of $SO_2$, $Na_2SO_3$, $NaHSO_3$ and the like to the slurry prior to homogenization greatly lowers the viscosity of the final product by preventing the occurrence of cross-linking. It is considered preferable to add the $SO_2$ and the like while maintaining the slurry under alkaline conditions. Surprisingly, the beverage base of the present invention maintains its stability regardless of variations in viscosity and exhibits satisfactory stability even at quite low viscosities. In contradistinction, many prior art processes employ suspending aids and stabilizers which effect an increase in viscosity in order to attain acceptable stability.

In addition, it has been found that the soybean dispersion of the present invention can be used as a coffee whitener or "cream" that does not "feather" or coagulate and separate when mixed into hot coffee. This has been accomplished by adding a good grade phosphate compound to the soybean beverage base. Both sodium hexameta phosphate and tripoly sodium phosphate were tried and are satisfactory. Additionally, either the potassium salts or a dry powder containing phosphate will serve as a satisfactory additive for the coffee whitener. The concentration of phosphate needed depends upon the strength or concentration of the coffee. It has been found that a phosphate additive in a proportion of about 0.5 percent is sufficient even for strong coffee. Moreover, it has been found that the addition of a food grade phosphate to the beverage base imparts freeze-thaw stability thereto thereby enabling the preparation of a coffee whitener that can be frozen and that will not separate or coagulate upon thawing. Still further, by inclusion of a small amount of fat, i.e., generally about 8 to 12 percent by weight in the coffee whitener, a coffee whitener with excellent whitening power is obtained.

It has also been found that the acid whey from cottage cheese, which normally exhibits an undesirable odor and flavor and which is usually disposed of as a waste by-product, provides an excellent source of milk sugar and protein for the beverage base of the present invention. Surprisingly, the inclusion of the cottage cheese whey imparts excellent flavor to the resulting product.

The following examples further define, describe and compare methods for preparing the soybean beverage base of the present invention and of utilizing said base to prepare a wide variety of useful food products. Parts and percentages are by weight unless otherwise indicated.

EXAMPLE 1

Wayne variety bin-run soybeans were passed through a Key cleaner which used size separation and air aspiration to remove foreign material. The cleaned beans were soaked in a solution of 0.5 percent sodium bicarbonate in tap water at room temperature for about 10 hours; the ratio was one gallon solution for each 4 lb. beans. This solution was drained and discarded. The soaked beans were transferred to a steam jacketed kettle containing fresh, boiling 0.5 percent sodium bicarbonate solution in a ratio of 2 gallons to 10 lb. soaked beans and boiling continued for 30 minutes. The blanched solution was drained and discarded. The blanched beans exhibited a tenderometer value of below 180. The blanched beans were passed through a Bauer burr mill with the plate to plate distance adjusted to break the beans into 2 to 3 pieces. This loosened the hulls so they could be floated off by flushing with room temperature tap water. Sufficient tap water was added to the dehulled soybean pieces to make 12 percent total solids. The suspension was then passed through a hammer mill (Fitzmill) using a No. 4 screen (0.25 inch openings). The resulting slurry was again passed through the same hammer mill but this time using the No. 1 screen (0.028 inch openings). The second slurry was placed in a steam jacketed kettle and heated to 200°F. The hot slurry was passed through a single piston, single stage, Manton-Gaulin lab homogenizer using 3,500 psi. pressure. The finished product, a soybean beverage base, was poured into a covered can which was placed in a room kept at 34°F. for cooling and storage.

EXAMPLE 2

A soy beverage base was prepared as in Example 1 except that the blanched beans were not dehulled. The whole blanched beans exhibited a tenderometer value below 180.

EXAMPLE 3

Twelve pounds of base at 12 percent total solid prepared as in Example 1 were mixed with 4 pounds of water and neutralized to pH 7.1 with 6 N HCl solution. 1.45 grams of vanillin, 14.5 grams of salt and 363 grams of sugar were added to the diluted base which was then heated to 180°F. in a steam jacketed kettle. This was removed from the kettle and a small amount, 0.5 ml, diacetyl flavor was added just before it was passed through the same homogenizer again at 3,500 psi. The beverage was bottled in capped prescription bottles which were placed in the 34°F. room for cooling and storage. The bottles were labeled "100 percent Soy Beverage." After 1 day the product was cool so it could be evaluated. It was completely lacking in bean-like or painty flavor and the taste and mouth feel were judged highly desirable; some people said it reminded them of a milk shake. The total plate count was under 20 bacteria per gram. After one mouth storage at 34°F., there was no noticeable settling or separation, the flavor was still acceptable and the total plate count was 350 per gram. After about 2 months storage the total plate count had exceeded one million, but no significant pathogenic bacteria were found.

EXAMPLE 4

Twelve pounds of base prepared exactly as in Example 2 were treated exactly as in Example 3. The resulting beverage containing the hulls was considered equal in quality to that described in Example 3 except it was creamier in texture.

EXAMPLE 5

Eight pounds of the base prepared in Example 1 were mixed with 8 pounds of fresh cottage cheese whey containing about 7 percent total solids and the mixture was adjusted to pH 7.1 with 20% NaOH solution. This liquid was then treated in exactly the same manner as was the diluted and neutralized base in Example 3, except that the salt content was reduced to half, 7.25 grams. The bottles were labeled "Soy-Whey Beverage." This product had a thinner mouth feel than the 100 percent Soy Beverage of Example 3 and thus was more desirable to some people. The flavor was highly desirable. After 1 month at 34°F. the product had not settled and the taste was still acceptable. After four months at 34°F., the product was still acceptable and the total plate count was only 30 per gram.

EXAMPLE 6

Eight pounds of soy beverage base from Example 1 were mixed with 8 lbs. fresh cottage cheese whey and the pH adjusted to 7.1 with 20% NaOH. 109 grams sugar and 109 grams 42 D.E. corn syrup were added and the mixture was heated to 180°F. in a steam jacketed kettle. Two ml. of imitation milk flavor were added to the hot liquid just before homogenizing at 3,500 psi. The product was bottled, labeled "Milk Substitute" and place in 34°F. storage. The taste was less sweet than the Soy-Whey Beverage of Example 5 and the flavor was highly desirable. After 1 month at 34°F. the product had not settled and the taste was still acceptable.

EXAMPLE 7

This product was prepared exactly as in Example 3 except that one additional ingredient was added — 73 grams of a low-fat cocoa. The initial flavor of this chocolate soy beverage was highly desirable and after 1 month at 34°F. it was still acceptable. Although it showed some settling of cocoa solids within a few days, they could be resuspended with shaking.

EXAMPLE 8

Soy base was prepared as in Example 1 except that less water was added; sufficient water was added to the dehulled soybean pieces to make 14.7 instead of 12 percent total solids. Fresh cottage cheese whey was concentrated from 7 to 14 percent total solids in a vacuum pan. Four lbs. base, 1.33 pounds whey, 11.74 grams stabilizer (National Pectin Co., No. 333) 293 grams sugar, 139 grams corn syrup, 2.9 grams salt, 0.59 grams of vanillin and 66 grams of coconut oil were mixed and the pH adjusted to 7.1 with 20% NaOH solution. The solution was heated to 180°F. and homogenized twice at 3,500 psi. After cooling to about 70°F., a Taylor shake freezer was used to further cool to 27°–28°F. and whip in air. This product imitated a soft serve ice cream and was judged to be highly desirable in flavor, texture and body.

EXAMPLE 9

A soy beverage base was prepared exactly as in Example 2. Four lbs. of this base, 3.1 grams sodium benzoate, 2 ml. diacetyl flavor, 60 grams salt and 4.35 grams carboxymethylcellulose were mixed together. 1209 grams soybean oil were treated with 80 grams mono- and diglycerides, 4.5 grams lecithin, and 0.8 ml. beta-carotene. The treated oil was heated to melt all ingredients and thoroughly mixed. The two liquids were mixed with a beater, the pH was adjusted to 5.5 with 6 N HCl, and the mixture was solidified in a home-type ice cream freezer. The finished product was an imitation diet margarine. It was evaluated as a cracker spread by many people and uniformly judged excellent in both flavor and texture.

EXAMPLE 10

A 14.7 percent total solids soy beverage base was prepared as in Example 8. 3,700 grams of this base, 4,500 grams fresh cottage cheese whey, 1,950 grams water, 1,020 grams sugar, 240 grams stabilizer (Sure-Shake, National Pectin Prod. Co.), 4.8 grams vanilla extract (R. W. Snyder Co.), 1.92 grams salt, 300 grams coconut oil, 193 grams protein isolate (D 100 WA, Gunther Prod. Co.), 1.2 grams sodium sulfite, and 1.2 grams dibasic potassium phosphate were mixed and the pH adjusted to 7.1 with 20 percent sodium hydroxide solution. This was heated to 180°F. in a steam jacketed kettle and homogenized at 3,500 psi. After cooling to 70°F. the liquid was passed through a Taylor shake freezer to further cool to 27°–28°F. and whip in air. The product drawn from the freezer was added to a sweet vanilla flavored syrup in a ratio of 9 oz. to 1 oz. and whipped with a Hamilton-Beach fountain mixer. The product was an imitation vanilla milk shake. The first overrun was 29 percent and the second overrun was 38 percent. The product was judged to have good texture and flavor.

EXAMPLE 11

Employing the procedure described in Example 1, 0.5 percent hexametaphosphate was added to the hot slurry before homogenization. The homogenized beverage base exhibited excellent freeze-thaw stability.

EXAMPLE 12

Twelve pounds of base at 12 percent total solids prepared as in Example 1 was diluted to 9 percent total solids. Coconut fat (1.2 lbs.) was added to the base. The resulting mixture was neutralized by addition of HCl, heated to 180°F., homogenized at 3,500 psi and then bottled. The resulting product served as a highly desirable coffee whitener with excellent whitening power. The coffee whitener did not feather, coagulate or separate when mixed into hot coffee.

EXAMPLE 13

The procedure described in Example 12 was repeated except that 0.5 percent hexametaphosphate was additionally added to the base along with the coconut fat. The resulting coffee whitener exhibited excellent freeze-thaw stability.

EXAMPLE 14

One pound beverage base at 9 percent solids prepared as in Example 4 was heated to 180°F. and ¼% $CaSO_4$ was added as a water slurry. The resulting mixture formed a curd upon cooling within one hour. When this curd was cut and pressed as in cheese making, water is expressed from the curd thereby increasing the soy protein concentration. The resulting concentrated product is known in the Orient as tofu.

EXAMPLE 15

One pound beverage base at 9 percent solids prepared as in Example 4 and at room temperature or below was mixed with a 0.25 percent of glucono delta lactone in a water slurry. The resulting mixture is heated in a water bath between 180° to 212°F until coagulation occurs. The resulting product is a highly palatable soybean curd. Water was expressed from the curd to form tofu as described in Example 14.

EXAMPLE 16

This example compares the colloidal stability of the soybean beverage base of the present invention with the prior art beverages hereinabove identified and described.

The dehulled beverage base of the present invention was prepared as in Example 1 except that the slurry was twice passed through the homogenizer at a temperature of 180°F. and a pressure of 3500 psi. The beverage base of the present invention obtained from the whole soybean including the hulls as in Example 2 was also prepared in the same manner except dehulling was omitted.

Colloidal stability of a soybean beverage as employed herein is defined as the maintenance of a homogenous liquid system, that is, the absence of the setting of the solids within the liquid. The system is, in fact, not a true colloid because the average particle size of the solid particles greatly exceeds the range normally considered as being within the colloidal size range.

The Kjeldahl method was used to determine total nitrogen in a liquid beverage system according to the standard procedure established by the Assoc. of Official Agricultural Chemists (AOAC) and set forth in their booklet entitled "Official Methods of Analysis." The results of this determination were multiplied by a common factor (6.24) to give protein content. This very precise analysis gives a measure of the amount of protein suspended in a beverage.

the various prior art process beverages and beverages of the present invention were prepared as described hereinabove and allowed to stand undisturbed for a length of time at 34°F following shaking. Samples of Kjeldahl nitrogen were taken as follows:

1. Top sample: about 15 ml beverage was drawn with a pipet from a point about one-half inch below the surface of the sample.
2. Bottom sample: about 15 ml beverage was drawn with a pipet from a point about one-half inch above the bottom of the liquid sample. The pipet was inserted carefully so as not to disturb the body of the liquid.
3. Mixed sample: about 15 ml beverage was drawn from a thoroughly mixed sample of the same lot. A product with good colloidal stability should show little or no variation in protein content in any of the samples; top, bottom and mixed. A product with poor colloidal stability (tendency to settle out) will show a difference among the samples.

The results obtained are summarized in Table 7 below:

EXAMPLE 17

In this example, the vacuum oven moisture method set forth in the AOAC Official methods of Analysis was used to determine total dry matter (by difference from 100) in liquid beverage samples of the present invention and the prior art according to standard procedure. This analysis is less precise than Kjeldahl nitrogen but does give a good indication of dry matter suspended in a soybean beverage.

As in Example 16, the various prior art process beverages and beverages of the present invention were prepared as described hereinabove and allowed to stand undisturbed for a length of time at 34°F following shaking. Samples for dry matter determinations were taken as follows:

1. Top sample: about 15 ml beverage was drawn with a pipet from a point about one-half inch below the surface of the sample.

TABLE 7

Colloidal Stability as Indicated by Protein Determinations of Samples from Bottles Allowed to Stand for Various Times.

| Sample | Length of time since shaking | % Protein Top | % Protein Bottom | % Protein Mixed |
|---|---|---|---|---|
| Present Process dehulled, flavored | 4 days | 3.30 | 3.26 | 3.26 |
| Present Process with hulls, flavored | 4 hours | 3.06 | 3.00 | 3.20 |
| Present Process with hulls, flavored 2.7% solids | 4 day | 0.86 | 0.87 | 0.87 |
| Present Process with hulls flavored 5.4% solids | 4 days | 1.67 | 1.65 | 1.66 |
| Present Process with hulls, flavored | 4 days | 3.01 | 3.00 | — |
| Present Process dehulled | 26 hours | 3.53 | 3.51 | 3.56 |
| Present Process with hulls | 26 hours | 3.50 | 3.50 | 3.45 |
| Hand, wet | 4 hours | 1.75 | 4.76 | — |
| Hand, wet | 4 days | 1.57 | 5.00 | 3.89 |
| Hand, dry | 4 hours | 2.97 | 4.71 | — |
| Hand, dry | 4 days | 2.66 | 5.24 | 4.10 |
| Mustakas, 9% | 5.5 hours | 2.77 | 5.40 | 3.88 |
| Mustakas, 9% | 21 hours | 2.88 | 5.29 | 3.88 |
| Mustakas, 11% | 5.5 hours | 2.61 | 6.21 | 4.83 |
| Mustakas, 11% | 21 hours | 2.98 | 6.35 | 4.80 |
| Mustakas, reconstituted | 5.5 hours | 1.44 | 6.75 | 3.34 |
| Mustakas, reconstituted | 21 hours | 1.41 | 6.70 | 3.29 |
| Lo, A | 6 days | 2.55 | 3.80 | 3.57 |
| Lo, B | 6 days | 2.90 | 3.76 | 3.38 |
| Lo, C | 6 days | 3.26 | 4.10 | 3.73 |
| Lo, D | 6 days | 3.20 | 3.71 | 3.50 |
| Miles, A | 6 days | 3.97 | 4.20 | 4.30 |
| Miles, B | 6 days | 3.58 | 3.85 | 3.84 |
| Miles, C | 6 days | 4.83 | ⋅• 5.28 | 5.14 |
| Miles, D | 6 days | 4.27 | 4.83 | 4.56 |

It can be seen that the soybean beverage of the present invention is clearly superior in colloidal stability as measured by Kjeldahl nitrogen as compared to the cited prior art processes. The high protein content in the bottom of the prior art samples indicates that protein as well as fibrous sludge precipitates out of these suspensions. It can also be seen that the beverages of the present invention exhibit a substantially uniform protein distribution regardless of dilution or viscosity and regardless of the presence or absence of the hulls.

2. Bottom sample: about 15 ml beverage was drawn with a pipet from a point about one-half inch above the bottom of the liquid sample. The pipet was inserted carefully so as not to disturb the body of the liquid.

3. Mixed sample: about 15 ml beverage was drawn from a thoroughly mixed sample of the same lot. A product with good colloidal stability should shown little or no variation in dry matter in any of the samples; top, bottom and mixed.

The results obtained are summarized in Table 8 below:

TABLE 8

Colloidal Stability as Indicated by Dry Matter Determinations of Samples from Bottles Allowed to Stand for Various Times.

| Sample | Length of time since shaking | % Dry matter top | % Dry matter bottom | % Dry matter mixed |
| --- | --- | --- | --- | --- |
| Present Process dehulled | 26 hours | 6.58 | 7.69 | 7.39 |
| Present Process with hulls | 26 hours | 7.70 | 7.89 | 7.06 |
| Hand, wet | 4 days | 4.85 | 9.60 | 8.10 |
| Hand, dry | 4 days | 6.71 | 11.94 | 9.45 |
| Mustakas, 9% | 5.5 hours | 6.64 | 12.32 | 9.04 |
| Mustakas, 11% | 5.5 hours | 6.92 | 14.21 | 10.91 |
| Mustakas, reconstituted | 5.5 hours | 3.78 | 16.30 | 7.47 |
| Lo, A | 6 days | 12.96 | 15.75 | 14.37 |
| Lo, B | 6 days | 13.11 | 14.66 | 14.29 |
| Lo, C | 6 days | 12.16 | 13.57 | 13.06 |
| Lo, D | 6 days | 6.31 | 8.43 | 7.47 |
| Miles, A | 6 days | 8.59 | 10.50 | 9.70 |
| Miles, B | 6 days | 7.39 | 9.77 | 8.64 |
| Miles, C | 6 days | 10.09 | 11.86 | 10.77 |
| Miles, D | 6 days | 8.97 | 10.33 | 9.49 |

Again, it can be seen that the beverages produced in accordance with the present invention are superior to those of the prior art in colloidal stability as measured by vacuum oven dry matter.

EXAMPLE 18

In this example, a comparison is made between beverages produced in accordance with the present invention and beverages produced according to the procedure of Hand et al., *Food Technology*, Dec. 1964, pp. 139 et seq. Two samples were prepared in accordance with the present invention (A and B) and four samples were prepared in accordance with the Hand et al. process (C through F). All samples were prepared from cleaned Wayne soybeans. The procedures employed and the results obtained are as follows:

A. Beans soaked in 0.5% NaHCO$_3$ solution overnight. Thereafter, the beans were blanched for 30 minutes in a 0.5% NaHCO$_3$ solution and then dehulled. The tenderometer value of the dehulled, tenderized beans was 176 pounds per 100 grams of beans (wet weight).

B. Same procedure as in A, but the beans were not dehulled. The tenderometer value of the hulled beans was 181 pounds per 100 grams (wet weight).

C. Dry beans were passed through a burr mill with a wide spacing so the skins were loosened and cotyledons separated. Halls were removed by air aspiration. Cotyledons were steamed at 212°F in an autoclave for 45 minutes. The tenderometer value of the dehulled beans was greater than 670 pounds per 100 grams of beans which represents the maximum measurement capability of the L.E.E. — Kramer Shear Press.

D. Same procedure as in C, except that the beans were not dehulled. Again the tenderometer reading was greater than 670 pounds per 100 grams.

E. The beans were steamed at 212°F. for 2.5 minutes, dried in a Proctor & Schwartz tray drier at 220°F. air temperature for 10 minutes and then dehulled by passage through a burr mill with air aspiration. The dehulled beans were then soaked overnight in tap water at room temperature, drained and then steamed at 212°F. for 45 minutes. The tenderometer value of the resulting bean was 430 pounds per 100 grams.

F. Same procedure as in E except that the beans were not dehulled. The resulting tenderometer reading was 422 pounds per 100 grams.

Samples A and B when subsequently milled with water to obtain a 12 percent total solids bean slurry and homogenized by passage twice through a homogenizer at a temperature of 180°F. at a pressure of 3,500 psi. provide beverages of a quality comparable to the dehulled and hull-containing samples of the present invention evaluated in Table 2, supra. Samples C through F when subsequently ground, slurried and homogenized at 2,000 psi. provide beverages of a quality comparable to the Hand, et al. wet and dry samples evaluated in Table 2, supra.

The significant superiority of the beverages of the present invention as compared to those of Hand et al. is attributed to the proper combination of tenderization and homogenization obtained in accordance with the process of the present invention. It appears that in the Hand et al. processes, neither sufficient tenderization nor homogenization is effected.

The following examples illustrate the need for the combination of the requisite tenderization and homogenization effected by the process of the present invention. Unless, or to the extent, otherwise specified, the standard procedure used in the following examples was as follows:

Six pounds of Wayne variety of soybeans were soaked overnight in 0.5% NaHCO$_3$ solution and then blanched in fresh 0.5% NaHCO$_3$ solution for 30 minutes. The drained beans were milled with cold water to obtain a 12 percent bean slurry. The slurry was then heated to 180°F. and homogenized at 3,500 psi. Thereafter the base was neutralized and again heated to 180°F and given a second homogenization at 3,500 psi.

EXAMPLE 19

Three samples were treated in the following manner:

A. Raw beans, without prior soaking, were blanched for 30 minutes in tap water at 212°F. Thereafter, the standard procedure was followed.

B. Raw beans, without prior soaking, were blanched for 30 minutes in a 0.5% NaHCO$_3$ solution at 212°F. Thereafter, the standard procedure was followed.

C. Sample B was repeated except that the standard procedure was modified by homogenizing the slurry twice at a temperature of 210°F and a pressure of about 4,500 psi.

The tenderometer values; homogenization conditions and evaluation of the resulting beverages are summarized in Table 9 below:

TABLE 9

| Sample | Tenderometer Value (No./100 gm beans) | Homogenization Conditions | | | Beverage Evaluation |
|---|---|---|---|---|---|
| | | Temp (°F) | Pressure (psi) | No. of Passes | |
| A | 310 | 180 | 3500 | 2 | poor mouthfeel, separated on standing |
| B | 185 | 180 | 3500 | 2 | borderline mouthfeel and stability |
| C | 185 | 210 | 4500 | 2 | excellent mouthfeel and stability |

EXAMPLE 20

Soybeans were soaked overnight in water and then, without prior cooking, simultaneously ground in 10 times its weight of boiling water. The resulting slurry was then treated in accordance with the standard procedure described above. The resulting beverage exhibited unacceptable mouthfeel in 4 hours and separation in 3 days. The product exhibited an unacceptable bean-like or painty flavor. This example illustrates that simultaneous grinding and heating is ineffective in inactivating the lipoxidase enzyme and preventing the bean-like or painty flavor in the final product. Additionally, this example demonstrates the need to effect tenderization and inactivation of the lipoxidase enzyme by treatment of the intact soybean cotyledons.

EXAMPLE 21

In this example, soybeans were soaked overnight in 0.5% NaHCO$_3$ solution and blanched for various periods of time in 0.5% NaHCO$_3$ solution at 212°F. Thereafter the standard procedure was employed except to the extent noted in Table 10 below which summarizes the results obtained.

There is an apparent limit on tenderization beyond which the beans become over-tenderized and a satisfactory beverage cannot be produced. It is difficult to precisely define the minimum acceptable tenderometer value since the lowest tenderometer value which can be recorded on a L.E.E.—Kramer shear press is about 16 pounds/100 grams soybeans. It has been found that beans tenderized to a tenderometer value of 16 pounds provide an entirely satisfactory beverage when further treated in accordance with the present invention. It has also been found that soybeans can be tenderized by prolonged blanching or pressure cooking to a tenderometer value which should obviously be below 16 but cannot be given a precise numerical value except <16. These latter beans which are believed to be over-tenderized have consistently been found to result in an unsatisfactory beverage. In addition to the fact that processes which effect over-tenderization are generally not economically attractive, it has also been found that the resulting beans are often discolored and the resulting beverage is characterized by poor stability, mouthfeel and especially, poor flavor. It is believed that over-tenderization in some way adversely affects the protein structure thereby giving rise to these undesirable characteristics. in the resulting product.

The following samples were prepared and illustrate the above.

A. Unsoaked soybeans were blanched for 30 minutes in boiling tap water resulting in a tenderometer value of 310 pounds per 100 grams. The tenderized beans were then treated in accordance with the standard procedure described above. The resulting beverage sepa-

TABLE 10

| Sample | Duration of Blanch (min.) | Tenderometer Value (No./100 gms) | Homogenization Conditions | | |
|---|---|---|---|---|---|
| | | | Temp (°F) | Pressure (psi) | No. of Passes |
| A | 5 | 250 | 180 | 3500 | 2 |
| B | 5 | 250 | 210 | 8000 (1st pass) 3500 (2nd pass) | 2 |
| C | 20 | 165 | 180 | 3500 | 2 |

Sample A exhibited borderline colloidal stability and mouthfeel.

Sample B exhibited excellent colloidal stability and highly acceptable mouthfeel.

Sample C exhibited excellent colloidal stability and highly acceptable mouthfeel.

EXAMPLE 22

This example illustrates the effects of both overtenderization and under-tenderization on the resulting soybean beverage.

rated upon standing and had unacceptable mouthfeel.

B. Soybeans were water soaked overnight and then pressure cooked at 250°F. for 60 minutes to give a tenderometer value of <16 pounds per 100 grams. The tenderized beans were then treated in accordance with the standard procedure described above. The resulting beverages exhibited good colloidal stability (did not separate on standing) and acceptable mouthfeel.

EXAMPLE 23

This example evidences the formation of an aqueous phospholipid-protein complex dispersion through the process of the present invention.

Hexane extraction is the industrial method for extracting oil from soybeans; of the original about 20 percent soybean oil, all but about 1 percent is extractable with hexane.

Enzyme inactivation and subsequent drum drying (heating) of whole soybeans does not result in complexing as is obtained in the present invention: drum dried flakes made from enzyme inactive Hark soybeans showed 17.8 percent fat by Soxhlet extraction with hexane.

A milk shake prepared from the beverage base of the present invention showed zero fat by the same extraction analytical procedure. To a homogenized 12 percent base obtained in accordance with Example 1 was added water, sugar flavor, stabilizer (gum) and coconut oil to equal 3 percent of the finished product. The mix was then heated and homogenized a second time. A sample was freeze dried and the resulting powder was placed in a Soxhlet extraction apparatus with the same solvent as above. No fat was recovered from the solvent showing that the protein complexed not only the native soybean oil but with the added coconut oil as well.

It is known that hexane, a non-polar solvent, dissolves only non-polar compounds, i.e., when fat is complexed with protein it becomes polar. One method of determining complexed fat is to digest the mixture with concentrated sulfuric acid. This solubilizes the protein and frees the fat which then rises as a layer of fat on water where it is measured.

This so-called "Babcock" test developed for the dairy industry was applied to the soy beverage of the present invention containing, in this sample, 3.1 percent protein. Taking the usual ratio of 2 parts protein to 1 part fat in soybeans, the expected fat concentration was 1.65 percent. The test showed 1.70 percent fat, indicating complete recovery within experimental error.

Since the beverage must be digested with sulfuric acid to "free" the fat which is not soluble in hexane, this is positive evidence of complex formation.

Although this example illustrates that all of the soybean oil is complexed with the soybean protein, it is currently believed that an acceptable product can be obtained with a major amount i.e. greater than 50 percent of the soybean oil complexed while a minor amount of the soybean oil, preferably less than about 10–15 percent remains uncomplexed.

Although specific materials and conditions were set forth in the above exemplary processes for making the soybean beverage base of the present invention and using said base to form other food products, these are merely intended as illustrations of the present invention. Various other tenderization techniques, lipoxidase inactivation techniques, milling methods, homogenization techniques, additives, derivative food products and operating conditons such as those described hereinabove may be substituted in the examples with similar results.

Other modifications of the present invention will occur to those skilled in the art upon a reading of the present disclosure. These are intended to be included within the scope of this invention. Thus, for example, the process of the present invention can be conducted by soaking soybeans overnight, then heating the beans for a period sufficient to inactivate the lipoxidase but insufficient to fully tenderize the beans into the desired tenderometer range. The lipoxidase-inactivated, partially tenderized beans can then undergo partial size reduction to increase the effective bean surface area thereby increasing the rate of further tenderization. Thereafter, further tenderization can be effected into the desired range followed by further milling and homogenization to obtain a desirable beverage. In such instances, the tenderometer values obtained with the beans which have undergone partial size reduction will generally be lower than the tenderometer values obtained on similarly treated whole beans since the smaller particles will pass through the tenderometer faster. The tenderometer values will, however, be equivalent on a whole bean basis.

As used herein, the phase "tenderometer value on an equivalent whole bean basis" is intended to denote a tenderometer value of a whole bean including the hull. In the present invention, it is important that lipoxidase inactivation be affected on intact soybean cotyledons. The process is operative whether the beans have been dehulled or not. When employing dehulled cotyledons or pieces of dehulled cotyledons, it is necessary to use a different cell in the L.E.E.—Kramer Shear Press, one with smaller openings such that the cotyledons will not fall through. In order to obtain a tenderometer value which would be equivalent to a similarly tenderized bean before dehulling, it is necessary to determine (with the smaller cell) tenderness of the tenderized bean both before and after dehulling. By taking bean samples at several degrees of tenderness, a calibration curve can be plotted which would provide the necessary conversion factor from tenderometer values of cotyledons or pieces to whole (with hulls) beans.

We claim:

1. Process for preparing a bland, stable aqueous dispersion of whole soybeans comprising:
    i. tenderizing intact soybean cotyledons until the soybeans exhibit a tenderometer value of between about 16 and about 300 pounds/100 gms of soybeans;
    ii. heating the intact soybean cotyledons sufficiently to inactivate the lipoxidase enzyme contained therein;
    iii. forming a slurry of the soybeans and water, said slurry having a soybean concentration of less than about 20 percent by weight;
    iv. homogenizing said slurry in at least one pass through a homogenization zone at a pressure between about 1,000 and 10,000 psi. at a temperature between about 32°F. and the boiling point of the slurry at the pressure within the homogenizing zone; and,
    v. recovering a bland, stable aqueous dispersion of whole soybeans.

2. Process as defined in claim 1 wherein the soybeans are dehulled before, during or after tenderization.

3. Process as defined in claim 1 wherein tenderization is effected on whole hull-containing soybeans.

4. Process as defined in claim 1 wherein tenderization is effected by exposing intact soybean cotelydons either simultaneously or sequentially to a combination of moisture and heat until an equivalent tenderometer value in the range of about 16 to about 300 pounds per 100 grams soybeans on a whole bean basis is obtained.

5. Process as defined in claim 1 wherein tenderization is effected by soaking the soybeans in water until the beans are saturated therewith and then blanching the soybeans, for a period of time sufficient to inactivate the lipoxidase enzyme contained therein.

6. Process as defined in claim 5 wherein soaking is effected in an alkaline solution.

7. Process as defined in claim 5 wherein the soaking and blanching of the soybeans are effected in an alkaline solution.

8. Process as defined in claim 1 wherein tenderization is effected by blanching previously unsoaked soybeans.

9. Process as defined in claim 1 wherein homogenization is effected such that the minimum degree of homogenization is inversely related to the degree of tenderization effected.

10. Process as defined in claim 1 wherein soybeans are tenderized to a tenderometer value ranging from about 16 to less than about 185 pount per 100 grams soybeans and a slurry of said soybeans is homogenized in at least one pass through a homogenizer at a pressure ranging from 1,000 to less than about 6,000 psi with slurry temperature ranging from about 32°F. to about the boiling point of the slurry at the system pressure.

11. Process as defined in claim 10 wherein the slurry is homogenized at a slurry temperature of about 180°F. by passing the slurry twice through the homogenizer at about 3,500 psi.

12. Process as defined in claim 1 wherein soybeans are tenderized to a tenderometer value ranging from about 185 to about 300 pounds per 100 grams soybeans and a slurry of said soybeans is homogenized in at least one pass through a homogenizer at a pressure ranging from greater than 6,000 to about 10,000 psi with slurry temperatures ranging from about 180°F. to about the boiling point of the slurry under the system pressure.

13. Process as defined in claim 12 wherein the pressure in the first pass through the homogenizer ranges from about 6,000 to 10,000 psi and the pressure in the second pass ranges from about 1,000 to 6,000 psi.

14. A bland, stable aqueous dispersion of whole soybeans prepared by the process of claim 1.

15. A bland, stable aqueous dispersion of whole soybeans prepared by the process of claim 2.

16. A bland, stable aqueous dispersion of whole soybeans prepared by the process of claim 3.

17. Process as defined in claim 1 wherein from about 100 to about 400 parts per million of a viscosity reducing agent is added to the soybean slurry prior to or during homogenization.

18. A soybean dispersion prepared by the process of claim 17.

19. Process as defined in claim 1 wherein cheese whey is admixed with the soybean dispersion.

20. A soybean dispersion produced by the process of claim 19.

21. Process as defined in claim 1 wherein the resulting soybean dispersion is admixed with cheese whey, flavorings and an edible oil and the resulting mixture is cooled to about 28°F and whipped in air to produce an imitation soft ice cream.

22. A soft ice cream produced by the process of claim 21.

23. Process for preparing a bland, stable aqueous dispersion of whole soybeans comprising:
  i. tenderizing intact soybean cotyledons until the soybeans exhibit a degree of tenderization as measured by equivalent tenderometer values, on a whole bean basis, of between about 16 and 300 pounds per 100 grams soybeans (wet basis);
  ii. simultaneously or sequentially heating the intact soybean cotyledons sufficiently to inactivate the lipoxidase enzyme contained therein;
  iii. forming an aqueous slurry of the soybean solids; and
  iv. homogenizing said slurry in at least one pass through a homogenizing zone at a temperature ranging from about 32°F. to about the boiling point of the slurry at the pressure within the homogenizing zone and at a pressure of from about 1,000 to 10,000 psi., the minimum degree of homogenization required as measured by increases in temperature, pressure and duration within the homogenizing zone being inversely related to the degree of tenderization effected.

24. Process for preparing a bland, stable aqueous dispersion of whole soybeans comprising:
  i. soaking soybeans in an aqueous $NaHCO_3$ solution,
  ii. blanching the soaked soybeans in an aqueous $NaHCO_3$ solution, the combined effect of said soaking and blanching being such that the soybeans exhibit a tenderometer value below about 185 pounds per 100 grams soybeans.
  iii. wet milling said beans to obtain an aqueous slurry of said soybeans having a solids content of about 12 percent by weight; and
  iv. passing said slurry twice through a homogenization zone at a temperature of about 180°F. and a pressure of about 3,500 psi.

25. Process for preparing a bland, stable aqueous dispersion of whole soybeans comprising:
  i. heating intact soybean cotyledons sufficiently to inactivate the lipoxidase enzyme and to partially tenderize the soybeans but insufficiently to tenderize the soybeans to a tenderometer value of between about 16 and about 300 pounds/100 gms. of soybeans;
  ii. partially reducing the size of said soybeans;
  iii. further tenderizing the soybeans until the soybeans exhibit a tenderometer value on an equivalent whole bean basis of between about 16 and 300 pounds per 100 gram soybeans;
  iv. forming a slurry of the soybeans and water, said slurry having a soybean concentration of less than about 20 percent by weight; v. homogenizing said slurry in at least one pass through a homogenization zone at a pressure between about 1,000 and 10,000 psi. at a temperature between about 32°F. and the boiling point of the slurry at the pressure within the homogenization zone; and,
  vi. recovering a bland, stable aqueous dispersion of whole soybeans.

26. Process for preparing a bland, stable aqueous dispersion of soybeans comprising:
  i. heating intact soybean cotyledons sufficiently to inactivate the lipoxidase enzyme contained therein and to partially tenderize said soybean cotyledons,
  ii. forming an aqueous slurry of the soybeans, said slurry having a soybean concentration of less than about 20 percent by weight;
  iii. further tenderizing the soybeans in said slurry until the soybeans exhibit a tenderometer value of between about 16 and about 300 pounds/100 grams of soybeans on an equivalent whole bean basis;

iv. homogenizing said slurry in at least one pass through a homogenization zone at a pressure between about 1,000 and 10,000 psi at a temperature between about 32°F. and the boiling point of the slurry at the pressure within the homogenizing zone; and, v. recovering a bland, stable aqueous dispersion of soybeans.

27. Process as defined in claim 26 wherein the soyeans are first dehulled to obtain said soybean cotyleons.

28. Process for preparing a bland, stable aqueous disersion of soybeans comprising:

i. heating intact soybean cotyledons sufficiently to inactivate the lipoxidase enzyme contained therein and to partially tenderize said soybean cotyledons;

ii. further tenderizing said soybean cotyledons until the soybeans exhibit a tenderometer value of between about 16 and about 300 pounds/100 grams of soybeans;

iii. forming an aqueous slurry of the soybeans, said slurry having a soybean concentration of less than 20 percent by weight;

iv. homogenizing said slurry in at least one pass through a homogenization zone at a pressure between about 1,000 and 10,000 psi at a temperature between about 32°F. and the boiling point of the slurry at the pressure within the homogenizing zone; and v. recovering a bland, stable aqueous dispersion of soybeans.

29. Process as defined in claim 28 wherein the soybeans are first dehulled to obtain said soybean cotyledons.

30. A process for preparing a stable aqueous soybean dispersion from lipoxidase inactivated soybean material comprising:

i. forming a slurry of lipoxidase inactivated intact soybean cotyledons and water, said slurry having a soybean concentration of less than about 20 percent by weight;

ii. tenderizing said lipoxidase inactivated soybean material in said slurry until said soybean material exhibits a tenderometer value of between 16 and about 30 poungs/100 grams of soybean on an equivalent whole bean basis; and, iii. homogenizing said slurry in at least one pass through a homogenizing zone at a temperature ranging from about 32°F. to about the boiling point of the slurry at the pressure within the homogenizing zone at at a pressure of from about 1,000 to 10,000 psi, the degree of homogenization being inversely commensurate with the degree of tenderization of said soybean material to produce a stable aqueous dispersion of said soybean material.

31. Process as defined in claim 30 wherein the lipoxidase inactivated soybean material is first tenderized and the tenderized soybean material is then formed into a slurry with water and said slurry is thereafter homogenized.

32. Process as defined in claim 30 wherein the soybean material is dehulled before lipoxidase inactivation.

33. Process as defined in claim 30 wherein the lipoxidase inactivated soybean material is dehulled after lipoxidase inactivation.

34. Process as defined in claim 30 wherein tenderization is effected on whole hull-containing soybeans.

* * * * *